No. 749,790. PATENTED JAN. 19, 1904.
A. B. HENDRYX.
CAGE TRAP.
APPLICATION FILED SEPT. 2, 1903.
NO MODEL. 2 SHEETS—SHEET 1.

Witnesses:
J. H. Shumway
Clara L. Weed.

Andrew B. Hendryx,
Inventor
By Attys Seymour & Earle

No. 749,790. PATENTED JAN. 19, 1904.
A. B. HENDRYX.
CAGE TRAP.
APPLICATION FILED SEPT. 2, 1903.
NO MODEL. 2 SHEETS—SHEET 2.
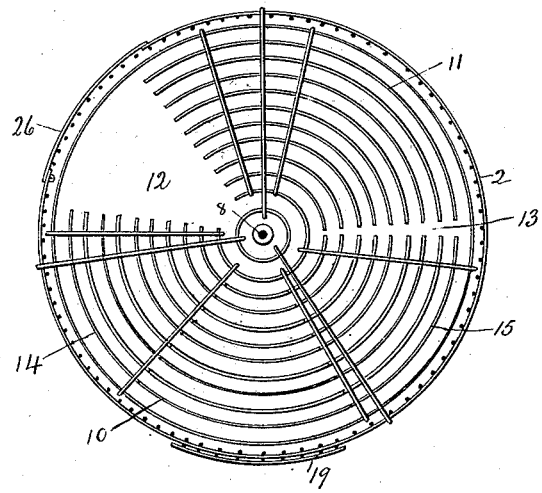
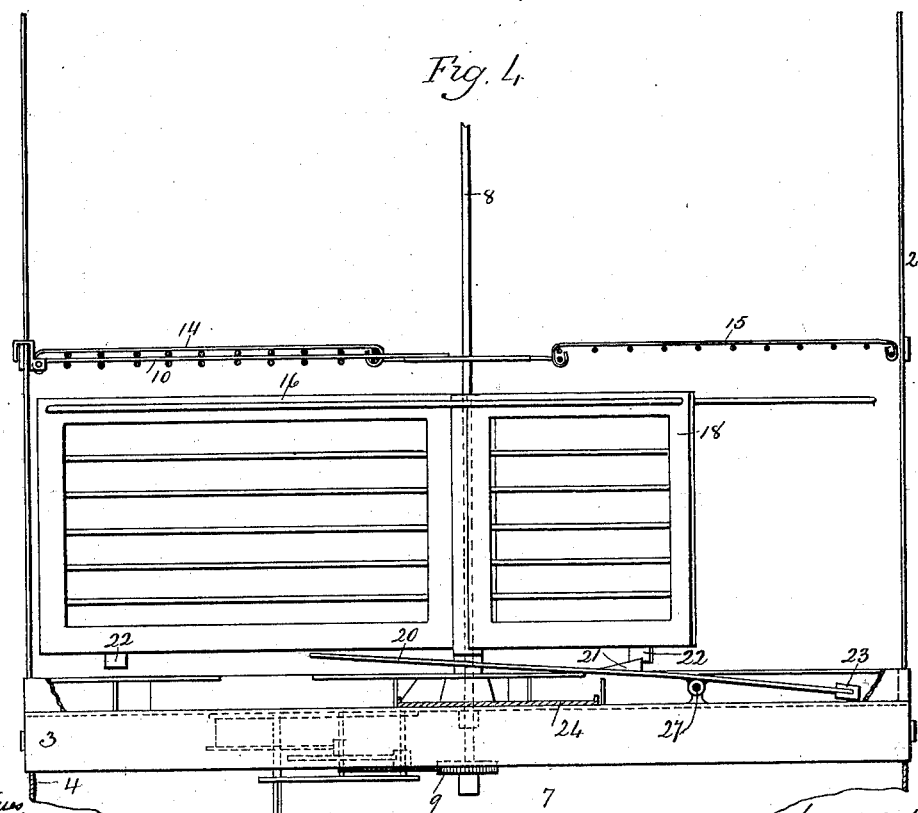

No. 749,790. Patented January 19, 1904.

UNITED STATES PATENT OFFICE.

ANDREW B. HENDRYX, OF NEW HAVEN, CONNECTICUT.

CAGE-TRAP.

SPECIFICATION forming part of Letters Patent No. 749,790, dated January 19, 1904.

Application filed September 2, 1903. Serial No. 171,596. (No model.)

*To all whom it may concern:*

Be it known that I, ANDREW B. HENDRYX, of New Haven, in the county of New Haven and State of Connecticut, have invented a new and useful Improvement in Cage-Traps; and I do hereby declare the following, when taken in connection with the accompanying drawings and the numerals of reference marked thereon, to be a full, clear, and exact description of the same, and which said drawings constitute part of this specification, and represent, in—

Figure 1:
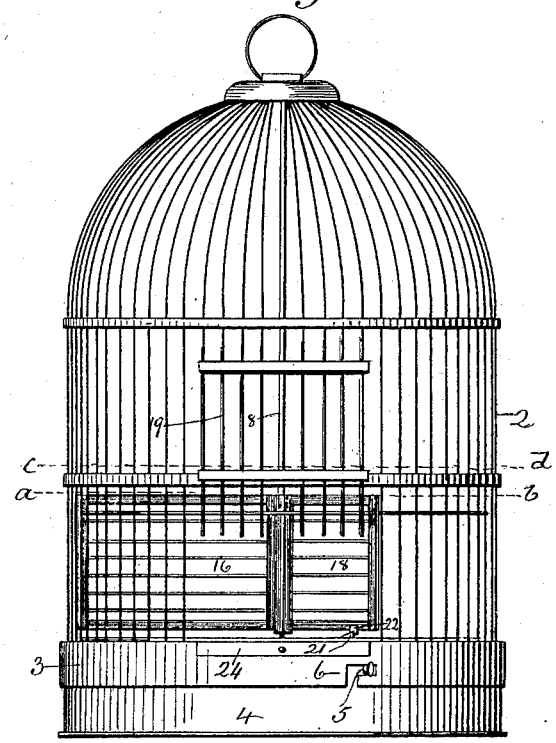
Figure 2:
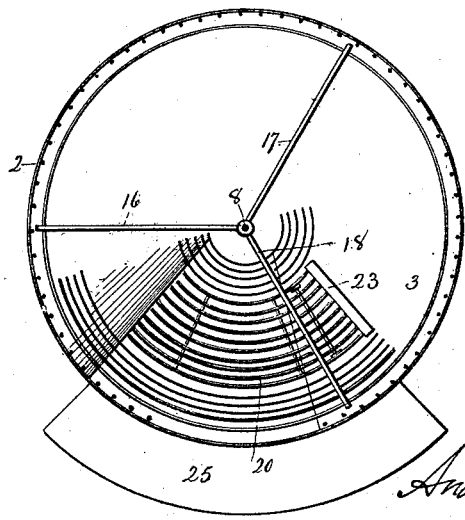

Figure 1, a side view of a cage constructed in accordance with my invention; Fig. 2, a transverse sectional view on the line *a b* of Fig. 1; Fig. 3, a transverse sectional view on the line *c d* of Fig. 1; Fig. 4, a longitudinal sectional view of the lower part of the cage.

This invention relates to an improvement in cage-traps, and particularly to cage-traps for birds, the object of the invention being to arrange a trap in cage form in which the trap is released by a bird entering the cage, the bird being carried forward from the entrance and allowed to enter the cage; and the invention consists in a simple arrangement of parts whereby the trap is continuously set and in certain details of construction and arrangement of parts, as will be hereinafter described, and particularly recited in the claims.

In carrying out my invention I employ a round cage 2, of wire, connected in the usual manner with a bottom 3, which in turn is connected with a base 4 through a pin 5 and slot 6, forming a chamber 7 beneath the cage. Extending vertically through the center of a cage is a shaft 8, which is turned by so-called "clock mechanism" 9. The cage is divided transversely by sectional partitions 10 11, between the ends of which are spaces 12 and 13, which may be closed or partially closed by wire slides 14 and 15, arranged above and supported by section 10. Upon the shaft below the partitions are three radially-arranged gates 16, 17, and 18, secured to the shaft so as to turn therewith and so arranged that when at rest two of the spaces between the gates will be below the openings 12 and 13, while the other opening is in front of a door 19, which is vertically movable, so as to regulate the size of the opening into the cage. Inside the door and hinged upon a rod 27, mounted upon the bottom 3, is a trip 20, also formed of wire and having a latch 21 in position to engage with lugs 22, depending from the lower edge of the gates. At one end the trip is provided with a weight 23, normally holding that end downward and the latch 21 in position to be engaged by the lug 22. Below the trip is a feed-tray 24, and, if desired, a platform 25 may be arranged outside the opening. In the upper portion of the cage is a door 26.

In setting the trap, food will be placed upon the feed-tray 24 and the slide 19 opened to the desired extent. A bird entering the trap will light upon the trip 20, depressing it and causing the latch 21 to release the lug 22, allowing the motive power to turn the shaft 8, and hence turn the gates 16, 17, and 18. Movement of the gates carries a bird from the entrance-chamber to a position beneath the opening 12, which may be adjusted to the desired extent, the bird naturally rising through this opening into the upper part of the cage. The trip being released, the weight raises it so that the latch 21 is in position to engage with the lug on the next succeeding gate and so that the trap is again set. If desired, the opening 13 may be made sufficiently large, so that in case a bird does not rise through the opening 12 it may rise through the opening 13 when carried beneath it by the movement of the gates.

I am aware that traps have been made with spring-operated wings or gates adapted to be released by the entrance of a bird or animal to the trap, and therefore do not wish to be understood as claiming broadly such as my invention.

Having fully described my invention, what I claim as new, and desire to secure by Letters Patent, is—

1. In a cage-trap, the combination with a wire cage having a detachable bottom, of a base connected with said bottom and forming a chamber, a vertically-arranged shaft extending upward from said chamber into said cage, driving mechanism in said chamber connected with said shaft for rotating it, radial gates mounted on said shaft within said cage, a trip arranged upon the bottom and adapted to engage and release said gates, a transverse partition above said gates, openings in said partition between the gates when in their normal position and slides by which the extent of the openings may be varied.

2. In a cage-trap, the combination with a circular wire cage having a bottom, a base secured to said bottom and forming a chamber, a vertically-arranged shaft extending upward from said chamber into said cage, driving mechanism in said chamber connected with said shaft for rotating it, radial gates mounted on said shaft within said cage, a trip arranged upon the bottom and adapted to engage and release said gates, an opening in the side of the cage adjacent to said trip, a transverse partition above said gates, and openings therein between the gates when in their normal position, substantially as described.

In testimony whereof I have signed this specification in the presence of two subscribing witnesses.

ANDREW B. HENDRYX.

Witnesses:
   FERDINAND A. WAGNER,
   EDWARD N. PECK.